United States Patent [19]
Downing et al.

[11] Patent Number: 5,513,560
[45] Date of Patent: May 7, 1996

[54] QUICK CHANGEOVER METHOD AND APPARATUS FOR CALENDER APPARATUS

[75] Inventors: Daniel R. Downing, Uniontown; William J. Head, Ravenna; James A. Benzing, II, Stow, all of Ohio

[73] Assignee: The Goodyear Tire & Rubber Company, Akron, Ohio

[21] Appl. No.: 369,027

[22] Filed: Jan. 5, 1995

[51] Int. Cl.$^6$ ..................................... B30B 3/00
[52] U.S. Cl. .................... 100/35; 72/239; 100/161; 100/168; 425/194
[58] Field of Search .................... 100/35, 102, 153, 100/155 R, 161, 168; 72/239; 414/911; 425/194, 367, 373

[56] References Cited

U.S. PATENT DOCUMENTS

| | | | |
|---|---|---|---|
| 2,941,465 | 6/1960 | Zimmerli | 100/155 R |
| 3,234,769 | 2/1966 | Bretschneider | 100/155 R |
| 3,413,921 | 12/1968 | Boatman | 100/168 |
| 4,368,633 | 1/1983 | Nogota | 72/239 |
| 4,552,007 | 11/1985 | Mantovan | 72/239 |
| 4,653,304 | 3/1987 | Feldmann et al. | 72/239 |
| 4,685,390 | 8/1987 | Plav et al. | 100/168 |
| 4,905,493 | 3/1990 | Benedetti | 72/239 |

*Primary Examiner*—Stephen F. Gerrity
*Attorney, Agent, or Firm*—David L. King

[57] ABSTRACT

A method and apparatus for rapid exchanging of calender rollers 350,352 for a calendering apparatus 302 is disclosed. The apparatus 302 has two or more generally cylindrical calender rollers 350,352 which are clamped and supported at each end by a rotatable support 314,316. A pair of the supports 314,316 are axially aligned and movable relative to the other axially aligned support. The method of exchanging rollers 350,352 includes the step of unclamping a roller 350 or 352 by increasing the spacing between the first and second rotatable supports 314,316, removing the roller 350, 352, and clamping a different calender roller 350,352 between the first and second supports 314,316 by decreasing the spacing between them and engaging the respective ends of the different roller 350,352 with the first and second supports 314,316. This apparatus and method greatly facilitates rapid calender roller changeover and is particularly useful in the tire building art.

6 Claims, 14 Drawing Sheets

QUICK CHANGEOVER METHOD AND APPARATUS FOR CALENDER APPARATUS

BACKGROUND OF THE INVENTION

This invention relates to a unique method and apparatus for exchanging calender rollers for a calendering apparatus. The calendering apparatus is particularly suitable for forming tire components of predetermined cross sections.

Historically, the pneumatic tire has been fabricated as a laminate structure of generally toroidal shape having beads, a tread, belt reinforcement and a carcass. The tire is made of rubber, fabric, and steel. The manufacturing technologies employed for the most part involve assembling the many tire components from flat strips or sheets of material. Each component is placed on a building drum and cut to length such that the ends of a component meet or overlap creating a splice.

These flat strips of elastomeric material could either be formed using an extruder or a profiled calender. In either case, the component would be formed having a predetermined cross-section.

If the cross-sectional shape of the component was changed for use in a different type or size tire a different profiled calender roller is required.

Conventional calender rollers are precisely supported on large fixed frames. These rollers generally have shafts inserted into heavy bearing assemblies, the bearing being assemblies bolted to these frames. Calender roller changeover conventionally can take several hours. This is normally not a major concern in that the need to change rollers in the past has been usually limited to damage or wear.

The present invention, however, is employed in such a novel way that the calender rollers must be frequently changed to accommodate different shapes, sizes and locations of forming a tire component. To make an apparatus capable of quick roller changeover was a requirement. The apparatus and method described herein takes a few minutes as opposed to hours to exchange rollers.

SUMMARY OF THE INVENTION

A method and apparatus designed for quick calender roller exchanging is described.

The calendering apparatus 302 for forming elastomeric components has a frame 180, two or more generally cylindrical rollers 350,352, a means 314,316 for clamping and supporting the calender rollers 350,352, and a means for rotating 340,342 one or more of the rotatable clamping and supporting means 314,316.

The frame 180 has a first end 310 and a second end 312, the second end 312 is slidably movable relative to the first end 310.

Each of the cylindrical rollers 350,352 is hollow and has a first and second end. The first end 357 and second ends 358 of the calender roller 350,352 are preferably conically tapered. The ends 357,358 are preferably tapered at an angle of about 6°.

The means for clamping and supporting 314,316 the calender rollers 350,352 are rotatably supported and positioned adjacent to one another with their respective axis (R) parallel to one another. The clamping and supporting means 314,316 being movable in the axial direction of the rollers 350,352 to vary the clamping force. The means 340,342 for rotating one or more of the rotatable clamping and supporting means is one or more variable speed motor 340,342.

The means for clamping and supporting the ends 357,358 of the roller 350,352 are rotatable hubs 314,316 having conical surfaces that mate with the conical ends 357,358 of the rollers 350,352. The hubs 314,316 are conically tapered at an angle of about 6°.

The apparatus 302 as described above greatly facilitates the exchange of calendered rollers.

The method of exchanging a calender roller 350,352 of a calender apparatus 302 with a different calender roller 350,352, the apparatus having axially aligned first and second rotatable supports 314,316 between which the calender roller 350,352 is rotatably clamped, has the following steps of: unclamping the roller 350,352 by increasing spacing between the first and second rotatable supports 314,316; removing the roller 350,352; and clamping a different calender roller 350,352 between the first and second supports 314,316 by decreasing the spacing between them and engaging the respective ends 357,358 of the different roller 350,352 with the first and second supports 314,316.

The method further includes the step of controlling the magnitude of the clamping force exerted on the different roller 350,352. The clamping force is controlled by providing mating conical surfaces on the roller 350,352 at the ends 357,358 and the first and second supports 314,316 and by controlling the spacing between the first and second supports 314,316 after their engagement with the different roller.

The above-described method describes exchanging one roller 350 or 352 when required both rollers 350 and 352 can be simultaneously exchanged with a different set of rollers 350 and 352 using the method described above.

The method of exchanging a plurality of calender rollers 350,352 with differential rollers 350,352 in a calendering system 200 having a plurality of calendering apparati 302, more than one calendering apparatus 302 has at least one calender roller 350,352 that is replaced by a different roller 350,352 and having axially aligned first and second supports 314,316 between which a calender roller 350,352 to be exchanged is clamped, is disclosed. The method has the steps of: establishing a staging area containing a plurality of different rollers to be exchanged for the plurality of calender rollers 350,352 to be exchanged in the calendering system; transporting the plurality of different rollers 350,352 with a transfer mechanism 400 to the calendering system 200 at one time; grasping the rollers 350,352 to be exchanged in the transfer mechanism 400; unclamping the rollers to be exchanged from their first and second respective supports 314,316; indexing the transfer mechanism 400; clamping the different rollers 350,352 between respective first and second supports 314,316 of each calender apparatus 302; and with the transfer mechanism 400 transporting the grasped rollers 350,352 to an area away from the calendering apparati. The above method describes replacing rollers from more than one calendering apparati 302. The method can be practiced exchanging at least one, preferably two rollers 350,352 from each apparati 302 simultaneously.

BRIEF DESCRIPTION OF THE DRAWINGS

FIG. 10 shows the transfer mechanism moving to pick up a set of roller pairs. FIG. 11 shows the mechanism carrying the replacement rollers. FIG. 12 shows the transfer mechanism lowered and clamping onto the first set of roller pairs. FIG. 13 shows the transfer mechanism being indexed to move the second set of rollers between the opened ends of calender apparatus. FIG. 13 also shows the calender apparatus being closed securing the second set of rollers. FIG. 14 shows the first set of rollers being returned to a roller staging area.

DEFINITIONS

"Aspect Ratio" means the ratio of its section height to its section width.

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Chafers" refers to narrow strips of material placed around the outside of the bead to protect cord plies from the rim, distribute flexing above the rim, and to seal the tire.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Shoulder" means the upper portion of sidewall just below the tread edge.

"Sidewall" means that portion of a tire between the tread and the bead.

"Tread" means a rubber component which when bonded to a tire carcass includes that portion of the tire that come into contact with the road when the tire is normally inflated and under normal load.

"Tread Width" means the arc length of the tread surface in the axial direction, that is, in a plane parallel to the axis of rotation of the tire.

DETAILED DESCRIPTION OF THE PREFERRED EMBODIMENT

Figure 1:
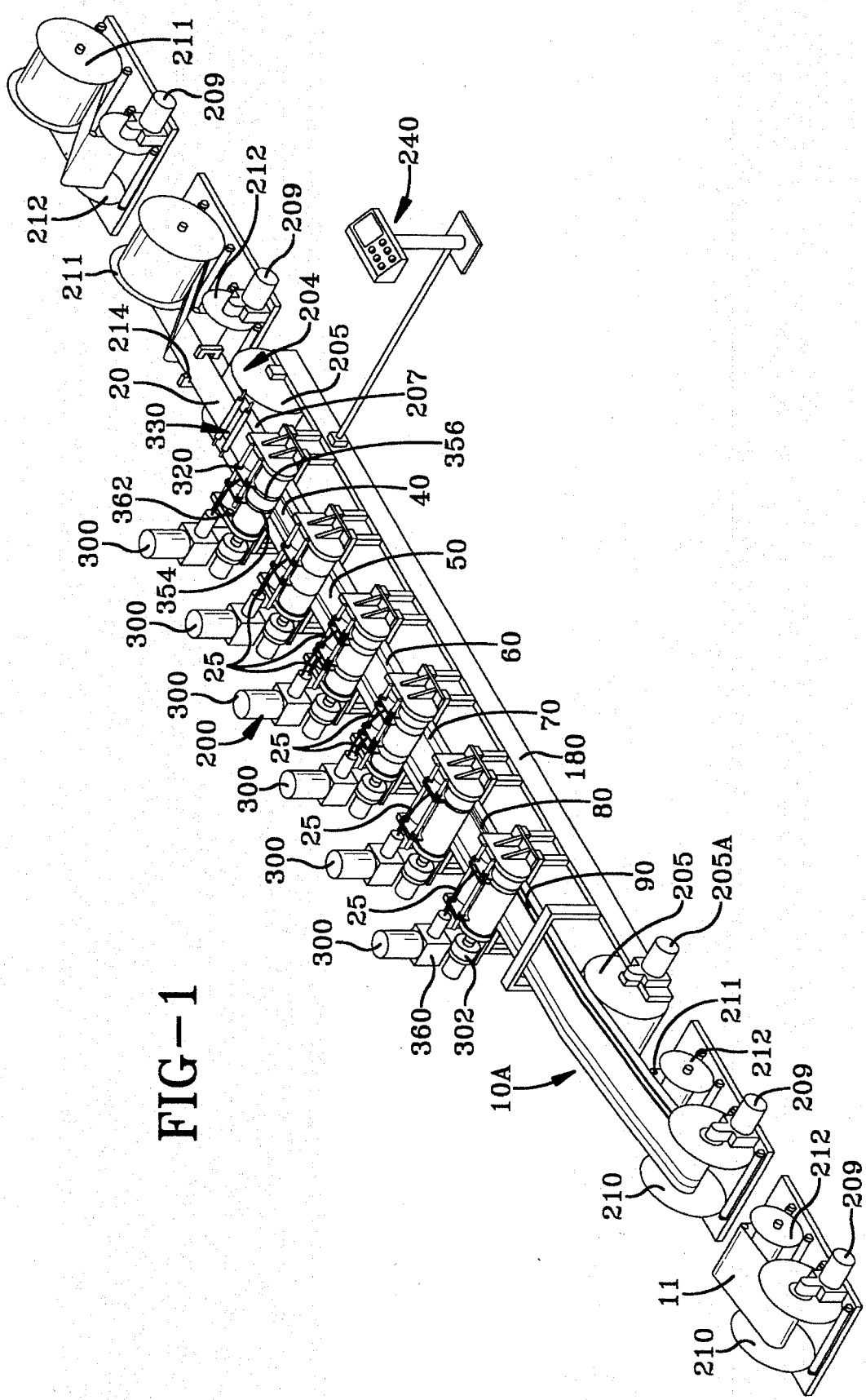
FIG. 1 illustrates a perspective view of a plurality of the calender apparatus 302 made in accordance with the invention, the combination of equipment being a unique machine 200 for forming a laminate 10.

Referring the FIG. 1 is illustrated an apparatus 200 for building a laminate 10A from an assembly of tire components suitable for use in forming a carcass for a radial ply pneumatic tire.

The laminate 10A is a substantially flat composite structure having many tire components attached and adhered to a radial ply 20.

As shown all of the components are either sheets or strips of material of substantially the same length. Each component shown is precisely located laterally relative to one another. This laminate 10A is described in co-pending patent application Ser. No. 08/369,026 entitled "A PNEUMATIC TIRE AND AN UNVULCANIZED CARCASS AS AN INTERMEDIATE ARTICLE IN ITS MANUFACTURE," which is incorporated herein by reference.

As shown in FIG. 1, the means 200 for forming the tire components is preferably a plurality of calender apparati 302.

This tire component forming apparatus 200 includes a means 500 for applying the formed components directly onto at least one side of the conveying ply material as shown in FIG. 1, thus forming the laminate 10A. The means 500 includes a roller 502 located under the belt conveyor 207, the roller 502 applies pressure to the conveying ply 20 and the formed component thereby causing the component to adhere to the ply material 20. The formed laminate 10A can then be cut to a length suitable for building a tire carcass or as illustrated in FIG. 1 the laminate 10A can have a separation liner 11 attached to one side of the laminate 10A and be wound onto a large roll or spool 210. When a sufficient amount or a predetermined length of the laminate 10A is wound onto a roll 210, the laminate 10A is cut parallel to the cords.

During the procedure of cutting the roll of laminate 10A it is recommended that a duplicate laminate back up station 210 be provided so that the apparatus 200 can either continue forming the laminate 10A or at least to minimize the stoppage of the machine 200 for roll changing. A means 209 for winding the rolls 210,211 and the separation liner roll 212 is provided, the means 209 having a motor.

Similarly, as illustrated in FIG. 1 the supply of rolls 211 of ply material 20 are best handled by having aligned rolls 211 of ply stock available to keep the apparatus 200 in a constant supply of material.

The apparatus 200 as designed can be stopped for short periods of several minutes without creating non-uniformities in the laminate 10A. However, these stoppages in material forming can be minimized or in fact eliminated by the duplicate ply supply 211 and laminate rolls 210 as depicted.

Once a laminate roll 210 is full it can be transported to a storage area or directly to a tire building work station. Once at the tire building station the laminate 10A can be cut to a predetermined length and applied to a tire building drum.

With reference to FIG. 1, a detailed view of the calender assembly 300 is shown. In the preferred embodiments of the invention the apparatus 200 includes a plurality of calender assemblies 300. Each calender assembly 300 is fundamentally the same as the next or adjacent one with the exception of the pair of calender rollers 350, 352.

Each calender assembly 300 represents a means for forming an elastomeric strip or strips of tire components. Preferably each calender assembly 300 includes a means for delivering processed elastomeric material 25 to the nip of the two calender rollers, the nip being radially above and between the two calender rollers 350, 352. The means for delivering processed elastomeric material as shown is an extruder 360, preferably each laminate forming apparatus 200 includes at least one such extruder 360, more preferably each calender assembly 300 includes one extruder 360.

The calender assembly 300 has a means 320 for laterally positioning the processed elastomeric material at a predetermined lateral location above the calender rollers 350, 352. The means 320 for positioning as shown in FIGS. 1 are called plows. At least one pair of plows 320 is laterally position at a predetermined location radially above the pair of calender rollers 350, 352. Each plow 320 has a pair of rigid members 324 contoured to precisely fit above and between the two rollers 350, 352. Preferably each plow 320 is placed laterally adjacent to a lateral end 354 of a component forming depression 356 located on one or both of the calender rollers 350, 352. This positioning of the plows 320 secures and provides lateral support while preventing an overflow of calendered material from forming and adhering to the conveying ply 20.

The extruder 360 feeding processed material 25 to a pair of calender rollers 350, 352 can be provided with a single feed source to produce one component such as a liner 50. However, when two identical components such as the gum shoulder strips 40 or the sidewalls 70 or the apex 30, or the chafer 60 is being formed, the extrudate can be split into two flow paths. One flow path feeding each component forming portions as shown in FIGS. 1.

In order for the apparatus to function automatically, a means 362 for metering the flow of extruded to the calenders must be provided. The means can simply be a sensor used in combination with the valving of the flow or the speed of the extruder. Nevertheless, it is believed preferable that the extruded material in the calenders 302 be monitored and controlled.

As shown in FIG. 1 sensors 362 can be provided in each calender assembly station 300 which are connected to a control panel 240 which can automatically adjust the flow of extrudate at a given station 300.

Figure 2:
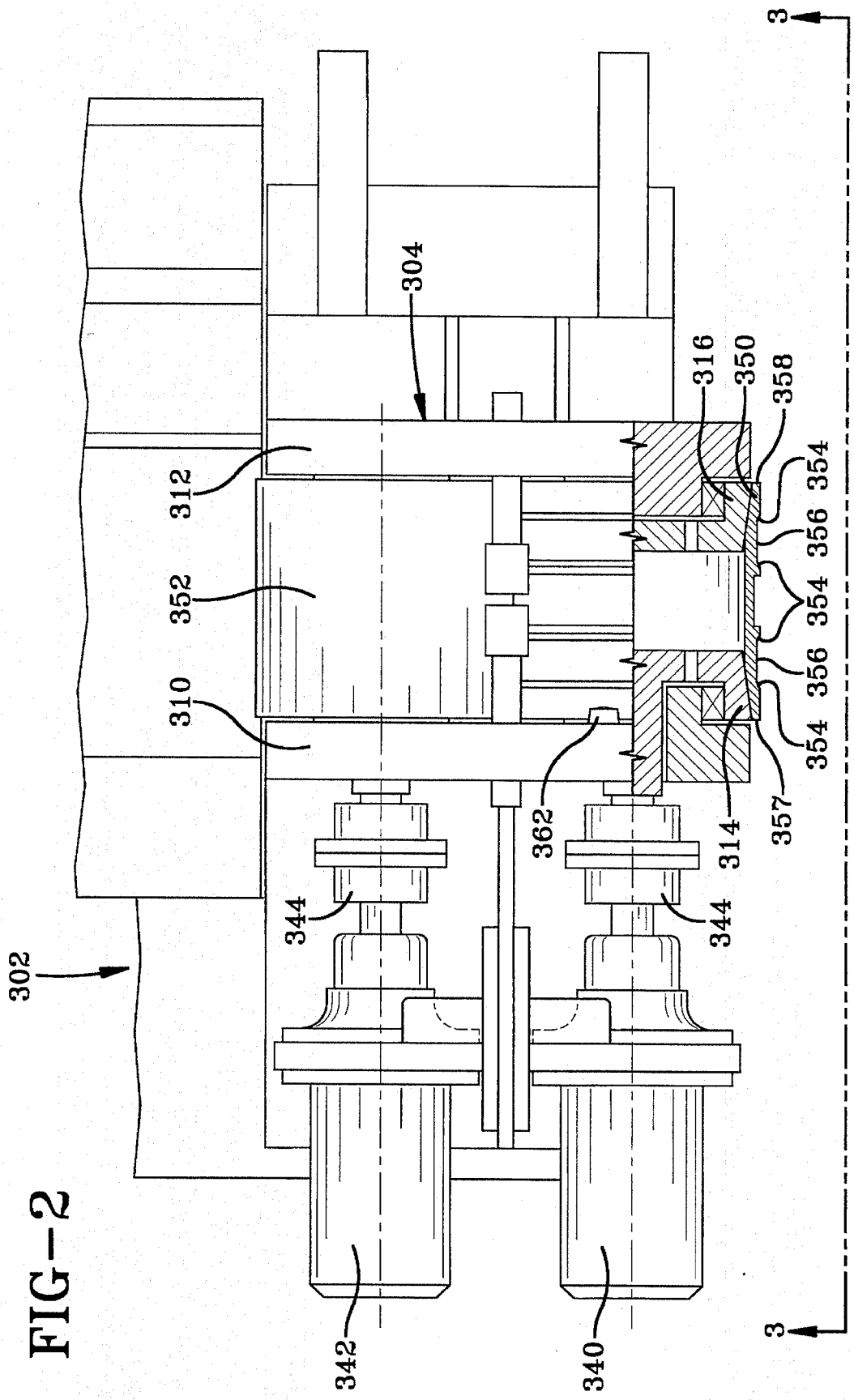
FIG. 2 is a top view of one calender 302 taken along lines 2—2 of FIG. 1, a portion of the calender being shown in cross-section.
Figure 3:
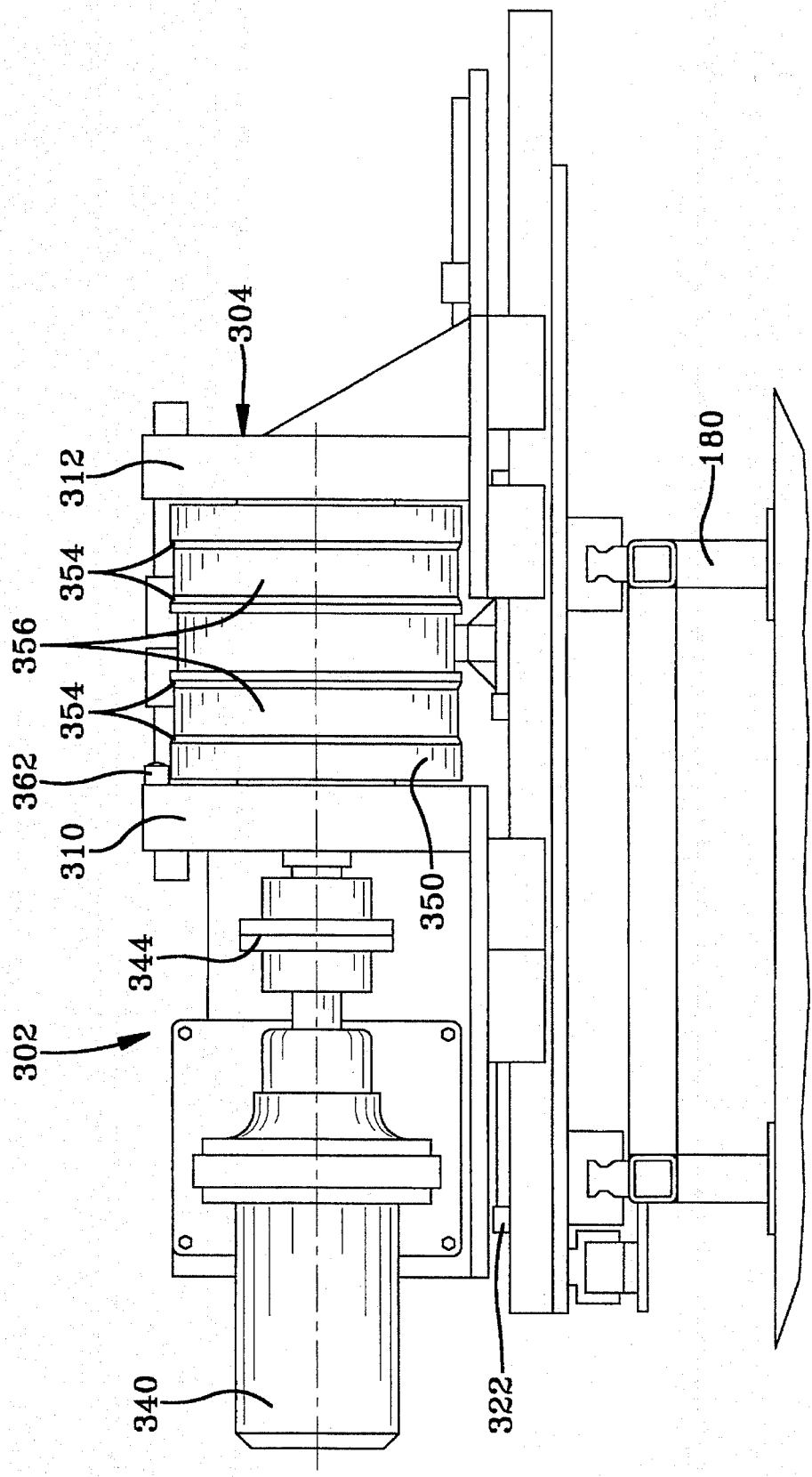
FIG. 3 is an end view of the calender taken along lines 3—3 of FIG. 2.

With reference to FIG. 2, each calender assembly 300 has a calender apparatus 302 which has two calender rollers 350, 352, one roller being the transfer roller 350 the other being the follower roller 352. Each roller is a hollow generally cylinder opened or tapered at each end 357, 358 and having an axis of rotation R.

Figure 5:
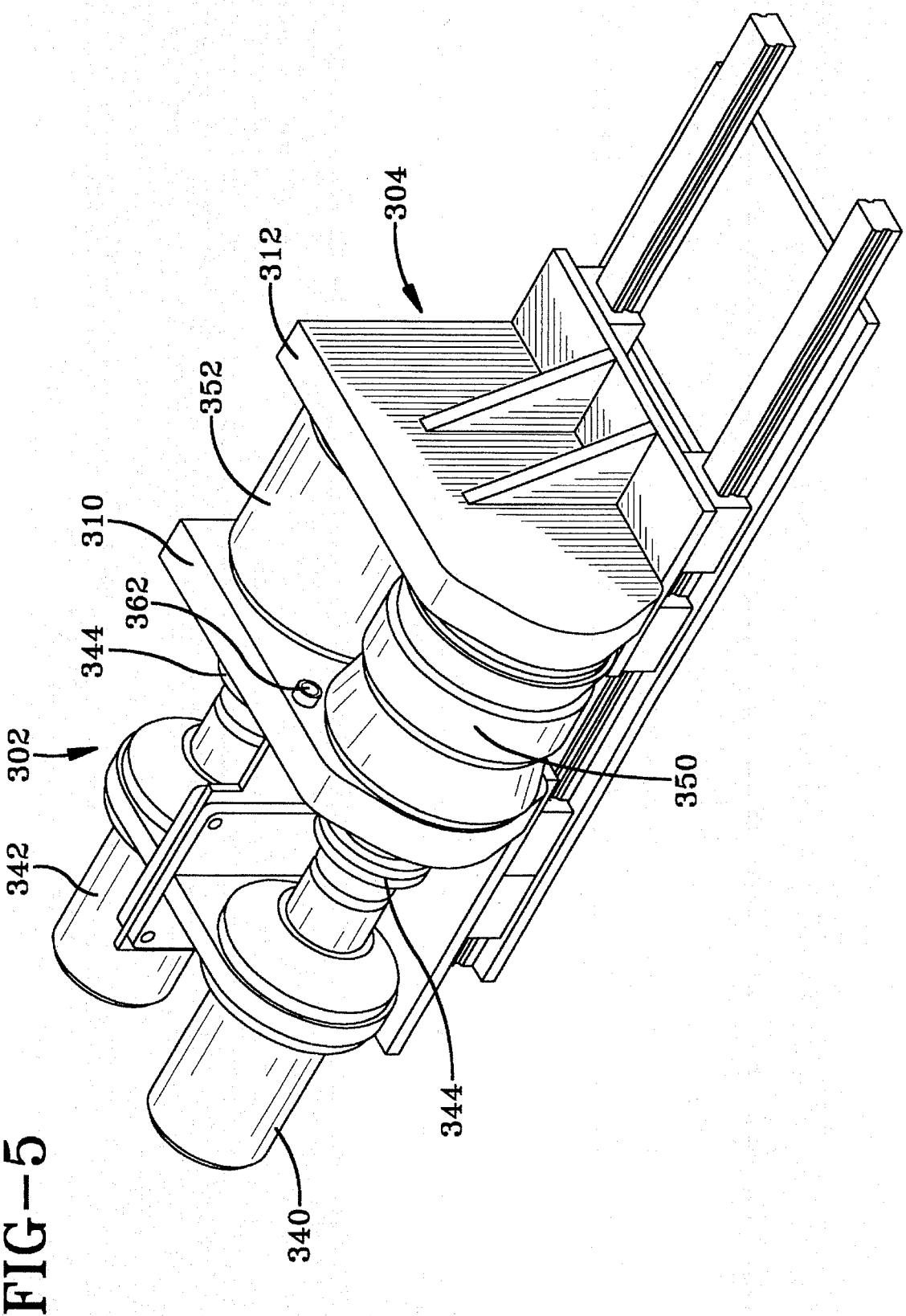
FIG. 5 is a perspective view of the calender with rollers attached.
Figure 6:
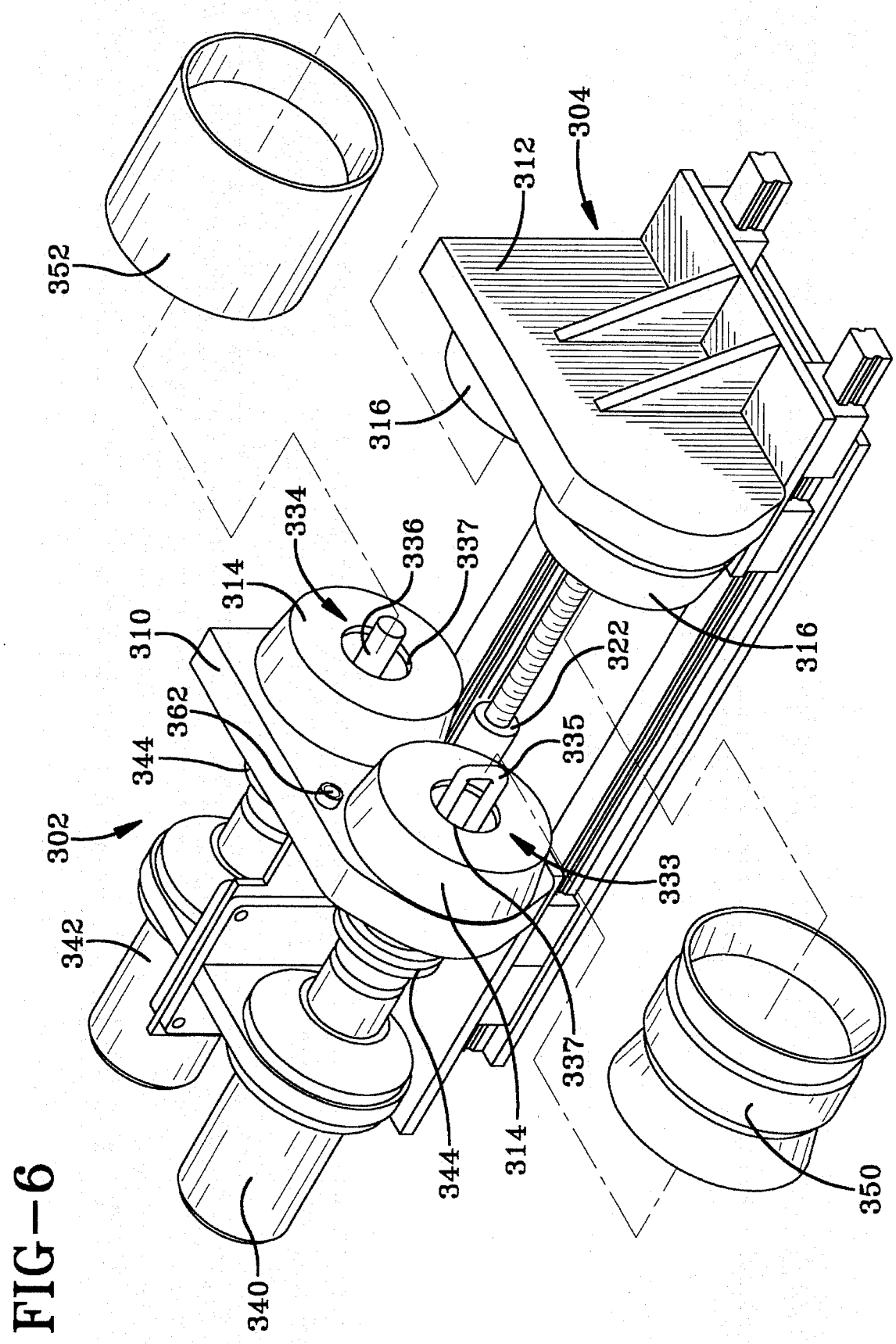
FIG. 6 is a perspective view of the calender with rollers detached.

The calendering apparatus 302 has a frame 180. As shown in FIGS. 5 and 6 the frame has a first and a second end 310, 312 the first end 310 being fixed and the second end 312 being slidably movable. Attached to each end 310, 312 of the frame 180 are a plurality of clamping and supporting means 314, 316. The clamping and supporting means 314, 316 are rotatable hubs 314, 316. The first end 310 and the second end 312 of the frame 180 each have a pair of rotatable hubs 314, 316, one hub 314, 316 fitting into each end 357, 358 of the roller. The pair of hubs 314, 316 when fitted into a roller 350 or 352 have an axis of rotation R coincident with the axis of rotation R of the roller 350 or 352. Each hub 314, 316 is conically tapered at an angle α of at least 6°. The cylindrical roller 350, 352 is similarly tapered at each end so that upon assembly the fitment of the hub and the roller is clamped and secure so that no slippage occurs that might create a non-uniformity in the formed component. In cases where the taper is greater than 6° or in severe torque loading the hubs and rollers may be mechanically keyed to prevent slippage.

As further illustrated in FIG. 2 each calender apparatus 302 has at least one, preferably two motors 340, 342, each motor powering a drive shaft 344, the drive shaft 344 being connected to a rotatable hub 314, 316, the hub providing rotational movement of one of the calender rollers 350 or 352.

Although one motor 340 is sufficient to drive one roller 350 it is believed preferable to have two variable speed motors, one motor driving each roller. The first motor 340 being connected to a roller called the transfer roller 350 is synchronized to match or slightly exceed the linear conveyor belt 207 speed so that the formed tire component can be applied to the conveying ply 20 at about the same rate of speed at which it is being formed.

The second motor 342 is connected to the roller called the follower roller 352 and it provides rotational movement at a speed of about 95% that of the first motor 340. This differential speed of the rollers 350 and 352 insures that the calendered component always adheres to the conveying ply 20 as opposed to attaching itself onto the follower roller 352.

Figure 4:
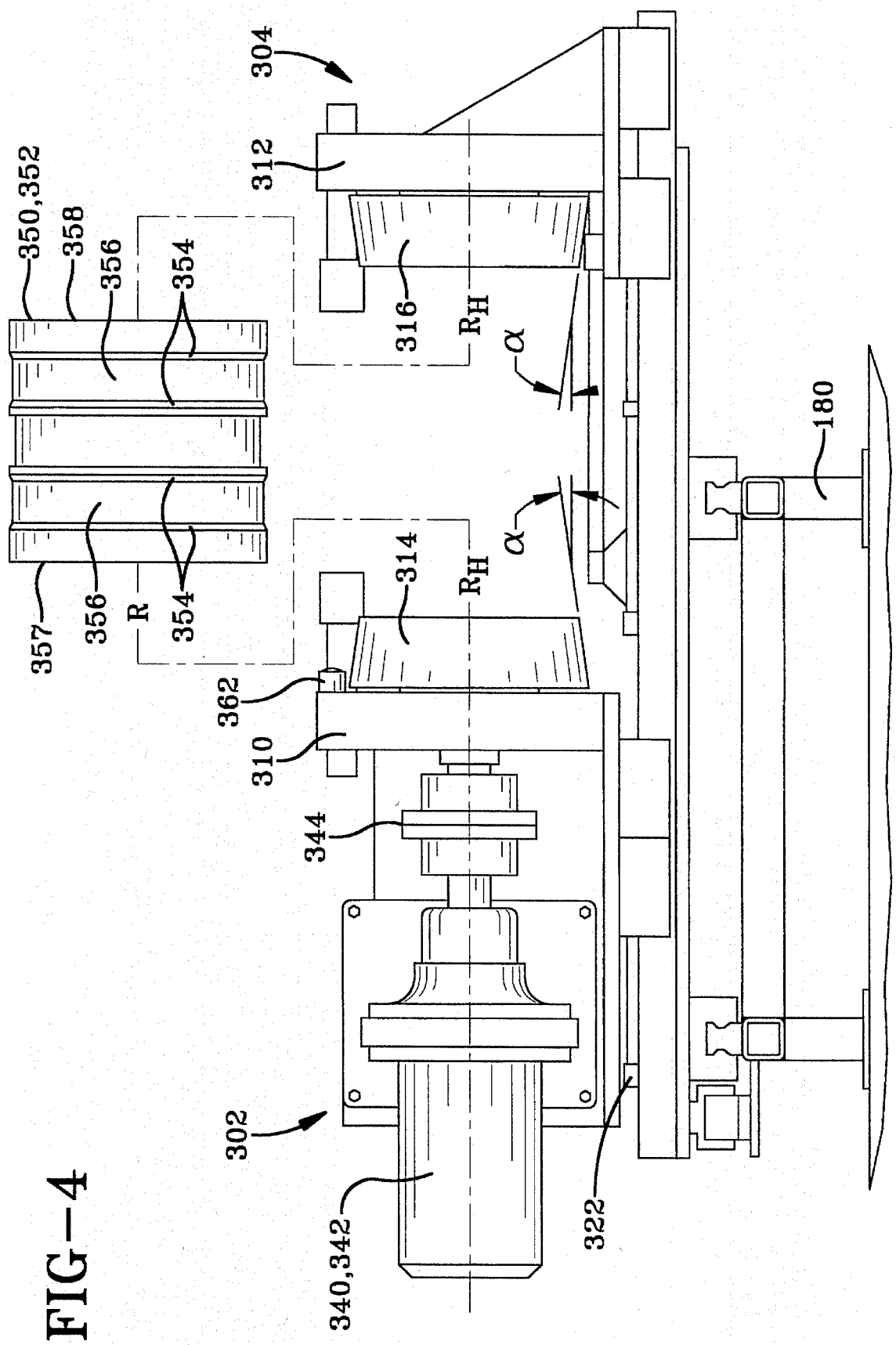
FIG. 4 is an end view of the calender showing the calender roller support ends in an expanded position and the roller detached.

As shown in FIGS. 4 through 9 each calender assembly 302 is adapted for quick roller changeover. This feature is accomplished in part by the method of attaching the roller cylinder 350 or 352 to a pair of tapered hubs 314, 316 and by providing a means 322 for slidably expanding and retracting relative to one another the first and second ends 310, 312 of the means 304 for supporting the calender rollers. As shown in FIG. 4 the second end 312 is slidably attached to the fixed portion of the frame 180 of the apparatus and upon actuation of a hydraulic cylinder 322 the second end 312 can slidably expand or retract thus permitting quick removal of the calender roller 350, 352.

The apparatus 302 has two or more cylindrical calender rollers 350, 352, each roller being clamped and supported at each end by a rotatable support 314, 316, a pair of these supports 314, 316 being axially aligned and movable relative to the other axially aligned support.

The method has the steps of unclamping a roller 350, 352 by moving outwardly one rotatable support 316 relative to the other axially aligned support 314 thereby detaching the roller from one support 314, then detaching the roller from the other support 316, removing the roller 350, 352 and inserting a second or replacement roller 350, 352 between the pair of axially aligned supports 314, 316, and then clamping the second roller 350 by moving inwardly one axially aligned support 316 relative to the other support 314.

A preferred method of exchanging a calender roller 350 from a calendering apparatus 302 has the method steps of simultaneously unclamping two rollers 350, 352 by moving outwardly a pair of rotatable supports 316, 316 relative to the pair of rotatable supports 314, 314 at the opposite ends of the rollers, thereby detaching each roller 350, 352 from one support 314, then detaching each roller from the remaining support 316; inserting a second pair of rollers 350, 352 between the two pairs of axially aligned supports 314, 316 and simultaneously clamping the second pair of rollers 350, 352 by simultaneously moving inwardly the pair of rotatable supports 316 towards their respective axially aligned rotatable supports 314.

It is believed that the method of clamping a pair of hollow generally cylindrical calender rollers 350, 352 in a calendering apparatus 302 is very novel. The apparatus 302 has two hollow cylindrical calender rollers each roller being supported at each end 357, 358 by a rotatable support 314, 316. A pair of supports 314, 316 is spaced apart and are axially aligned, the supports 314 and 316 being movable relative to the other. The method involves the steps of inserting a cylindrical calender roller 350 between the pairs of axially aligned spaced rotatable supports 314, 316 and clamping and supporting the cylindrical rollers 350 by moving inwardly a rotatable support 316 relative to the other rotatable support 314.

The preferred apparatus has a frame 180 which has a slidable second end 312 relative to a fixed first end 310, two or more cylindrical rollers 350, 352, each cylindrical roller being hollow and having a first end 357 and a second end 358; and a plurality of means 314, 316 for clamping and supporting the calender rollers 350 at the first and second ends 357 and 358. The means 314, 316 for clamping and supporting are each rotatable about an axis of rotation R. A pair of the supporting and clamping means 314, 316 are axially aligned, two supporting and clamping means being attached at each respective end of the frame 310, 312. One pair of the means 316 are inwardly and outwardly movable relative to the other axially aligned means 314.

The apparatus 302 also has a means 340 for rotating one or more of the rotatable clamping and supporting means, and a means 322 for moving inwardly and outwardly one or more axially aligned rotatable means 316 for clamping and supporting relative to the opposite axially aligned rotatable means 314 for clamping and supporting.

Figure 7:
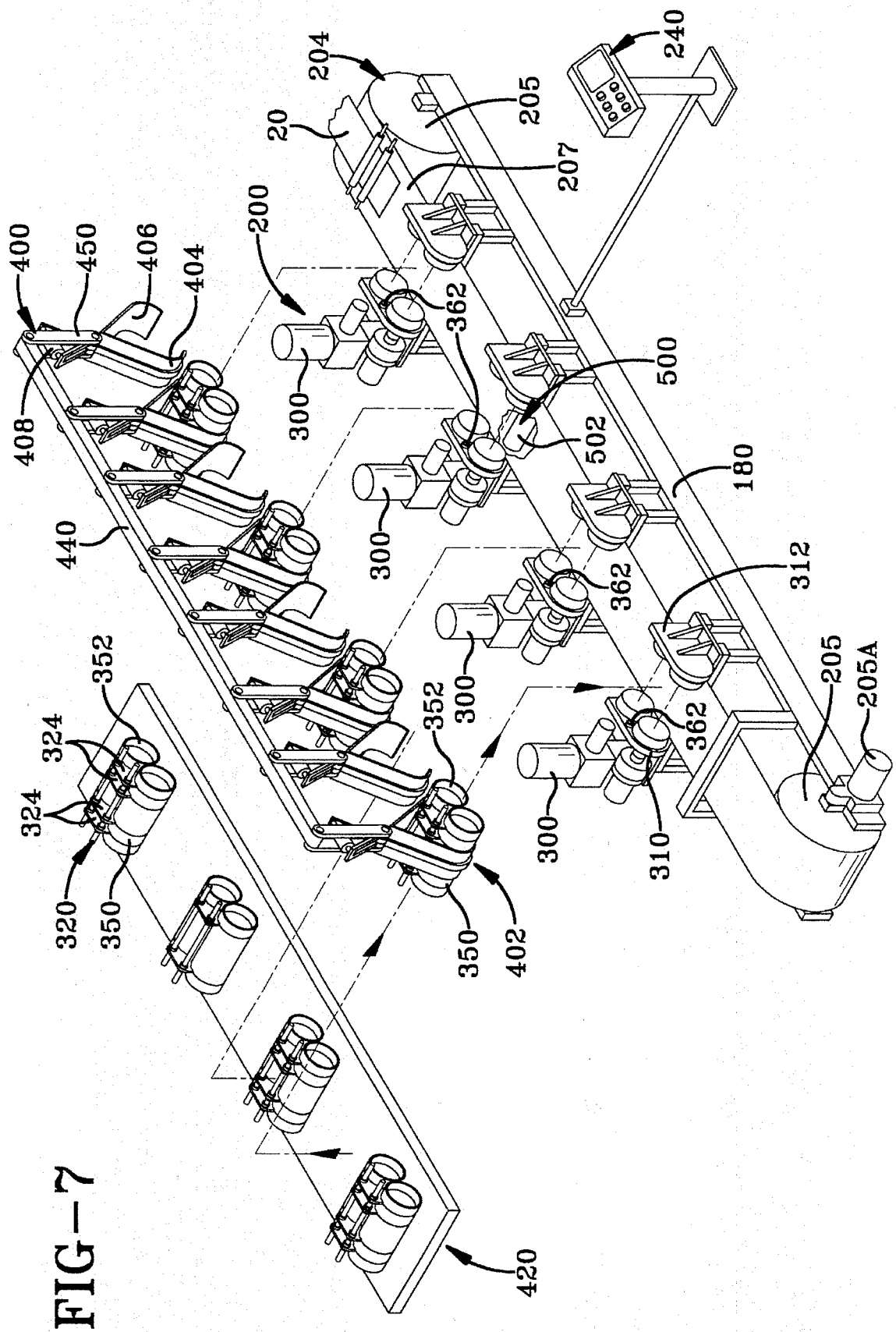
FIG. 7 is a perspective view of a roller transfer mechanism initially loading the apparatus.
Figure 8:
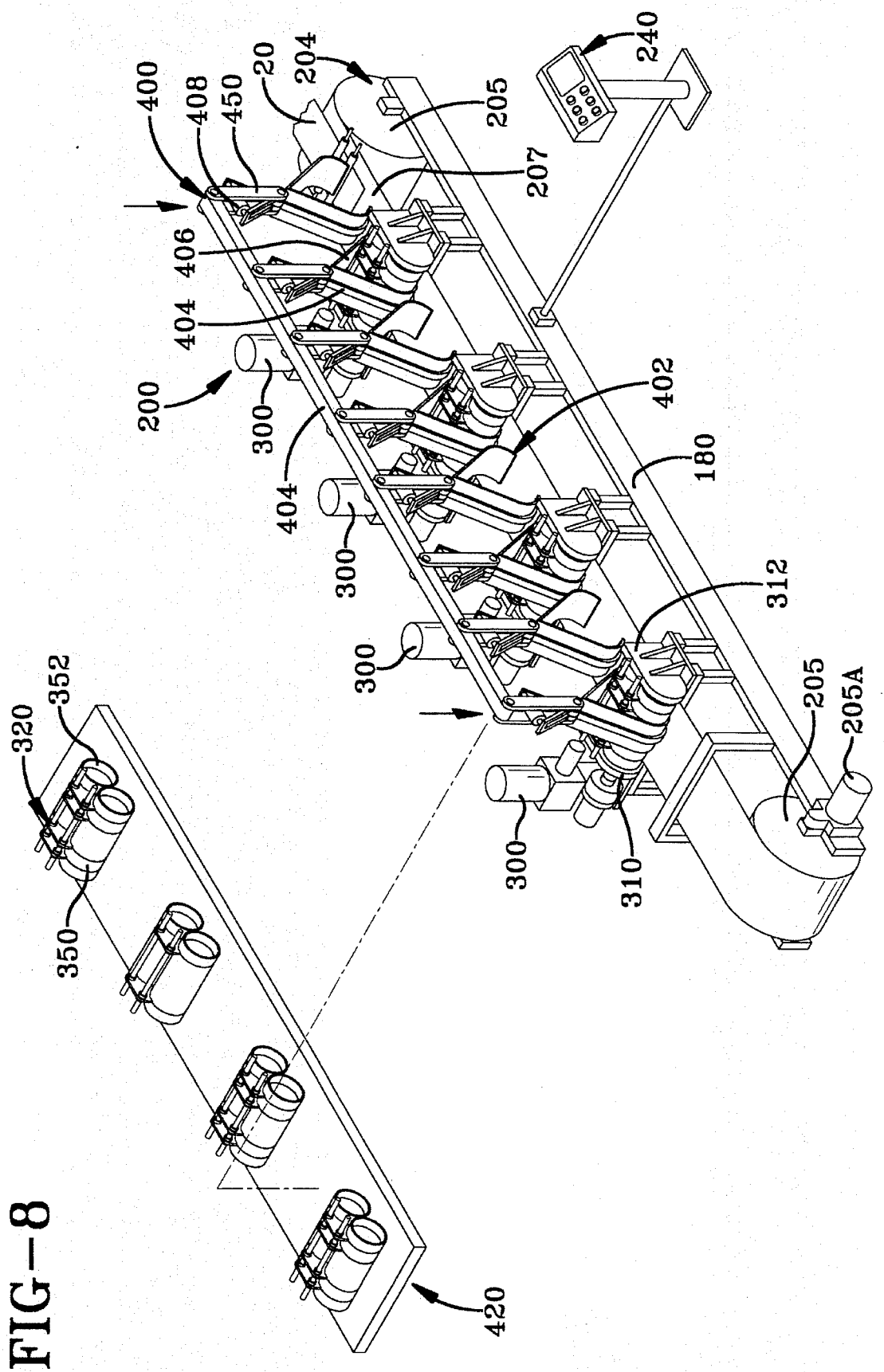
FIG. 8 is second view of the roller transfer mechanism depicting rollers being loaded into the apparatus.
Figure 9:
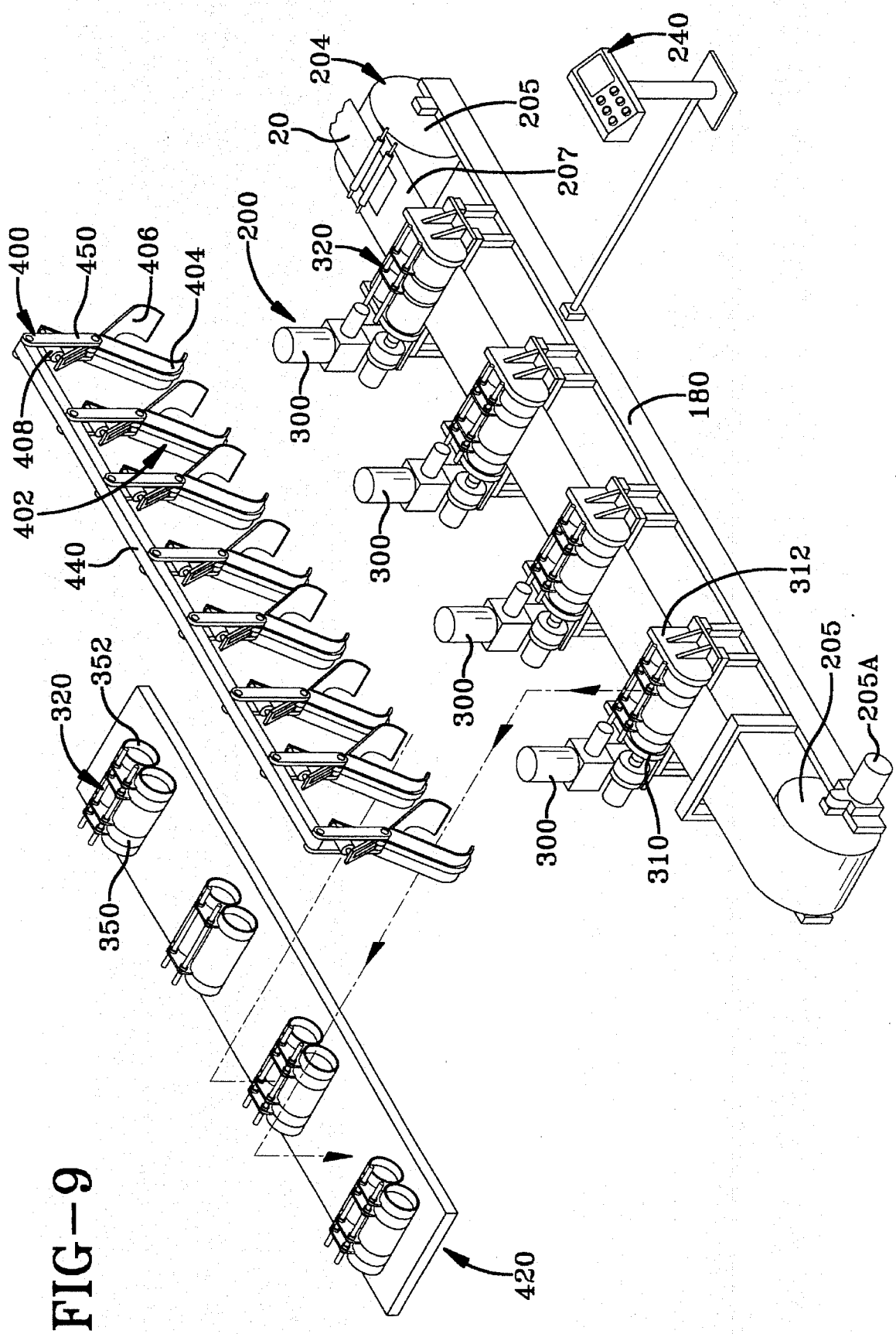
FIG. 9 is a third view of the transfer mechanism being moved to a roller staging area.

FIG. 7 illustrates how pairs of these quick change rollers can be conveyed by an overhead movable transfer mechanism 400 to initially load the laminate forming apparatus 200. Then, the mechanism 400 is lowered into position and the slidable end 312 of the frame 180 having the clamping and supporting means 316 is closed to secure the calender rollers 350, 352 into position as in FIG. 8. The overhead mechanism 400 is then moved back to a roller staging area 420 awaiting the next set of roller pairs to build a different size or style tire as in FIG. 9.

Figure 10:
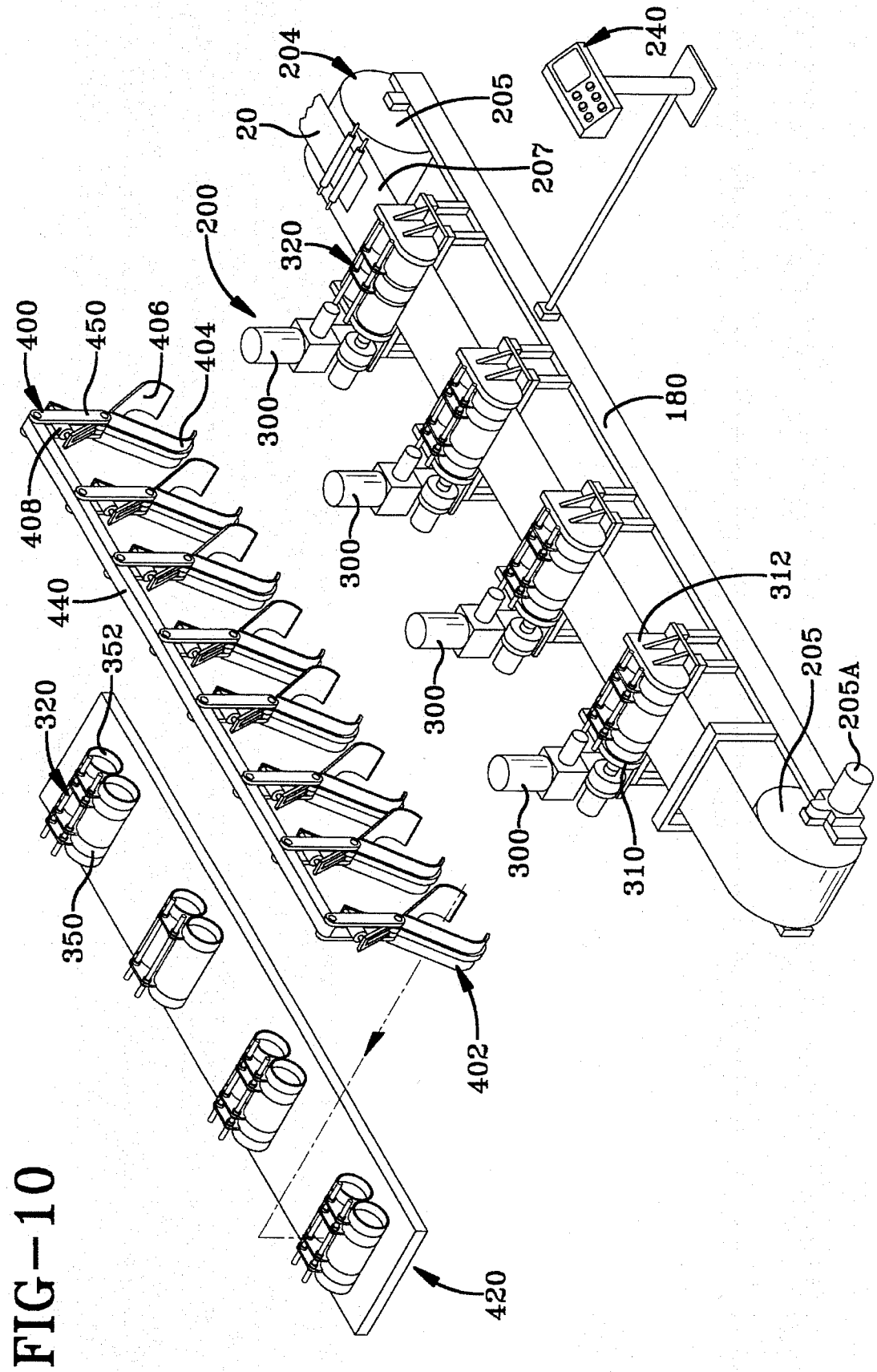
FIG. 10 through 14 illustrates a transfer of rollers to an operational apparatus, the figures depicting an exchange of one set of roller pairs with a second set.
Figure 11:
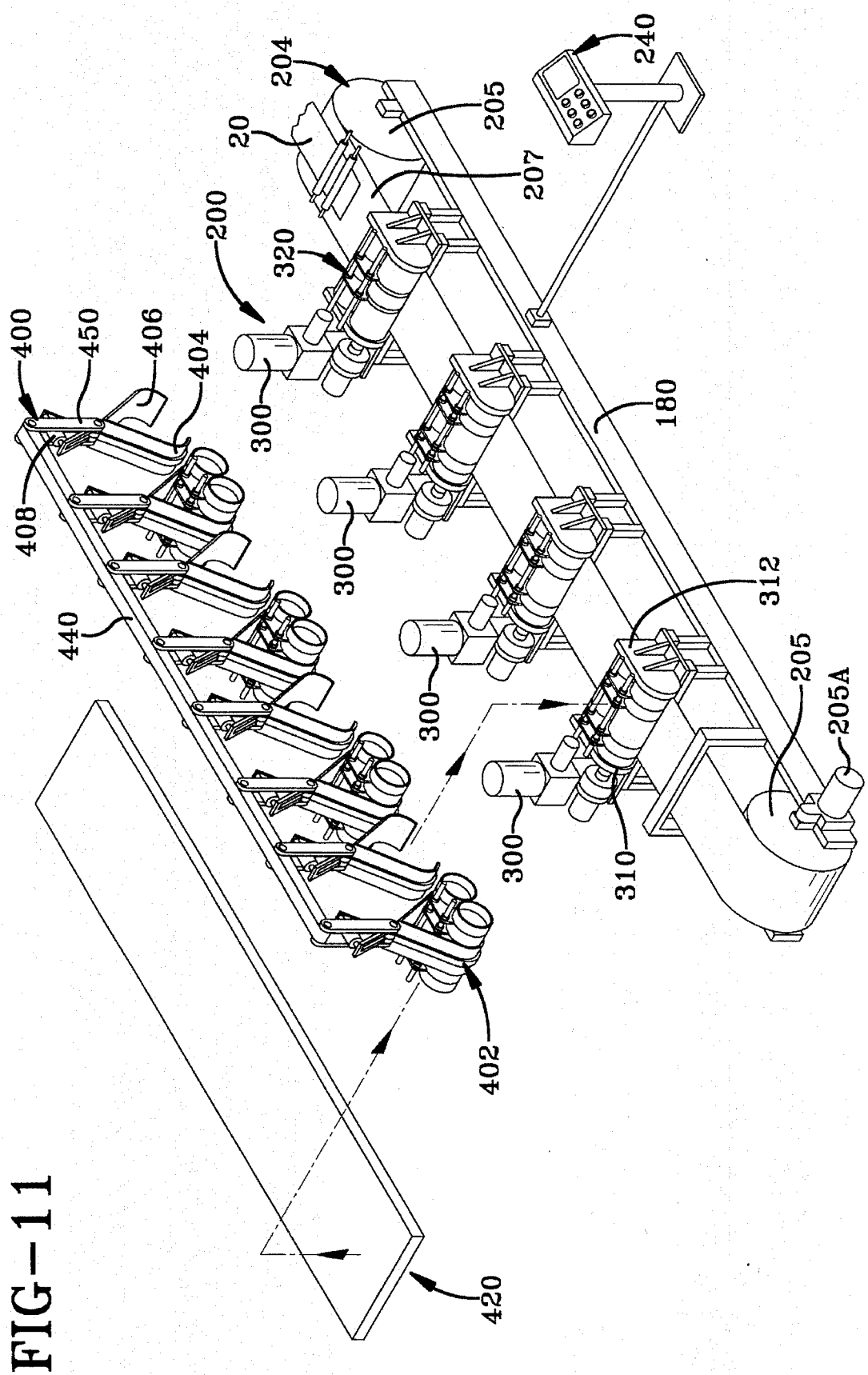
Figure 12:
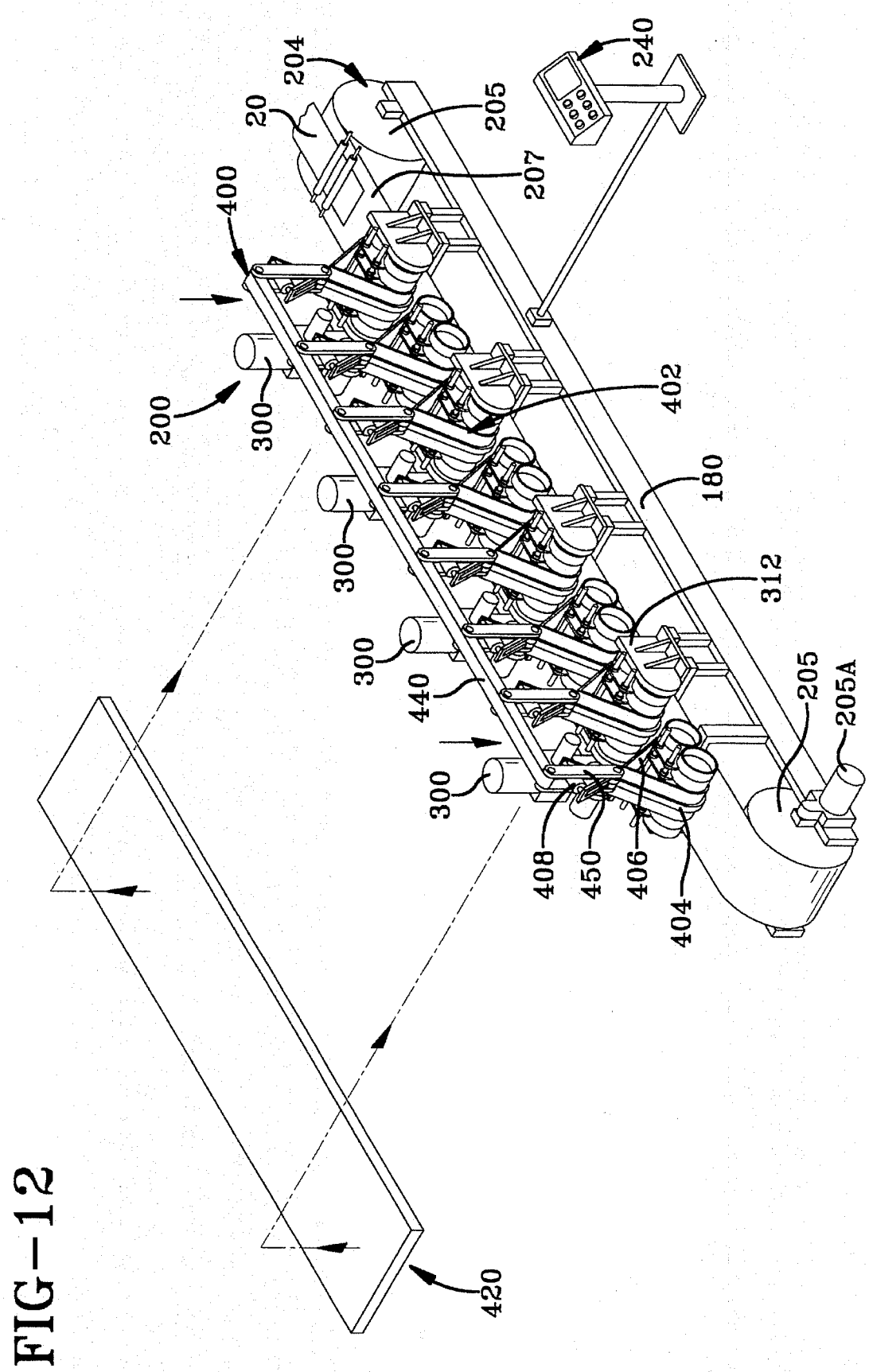
Figure 13:
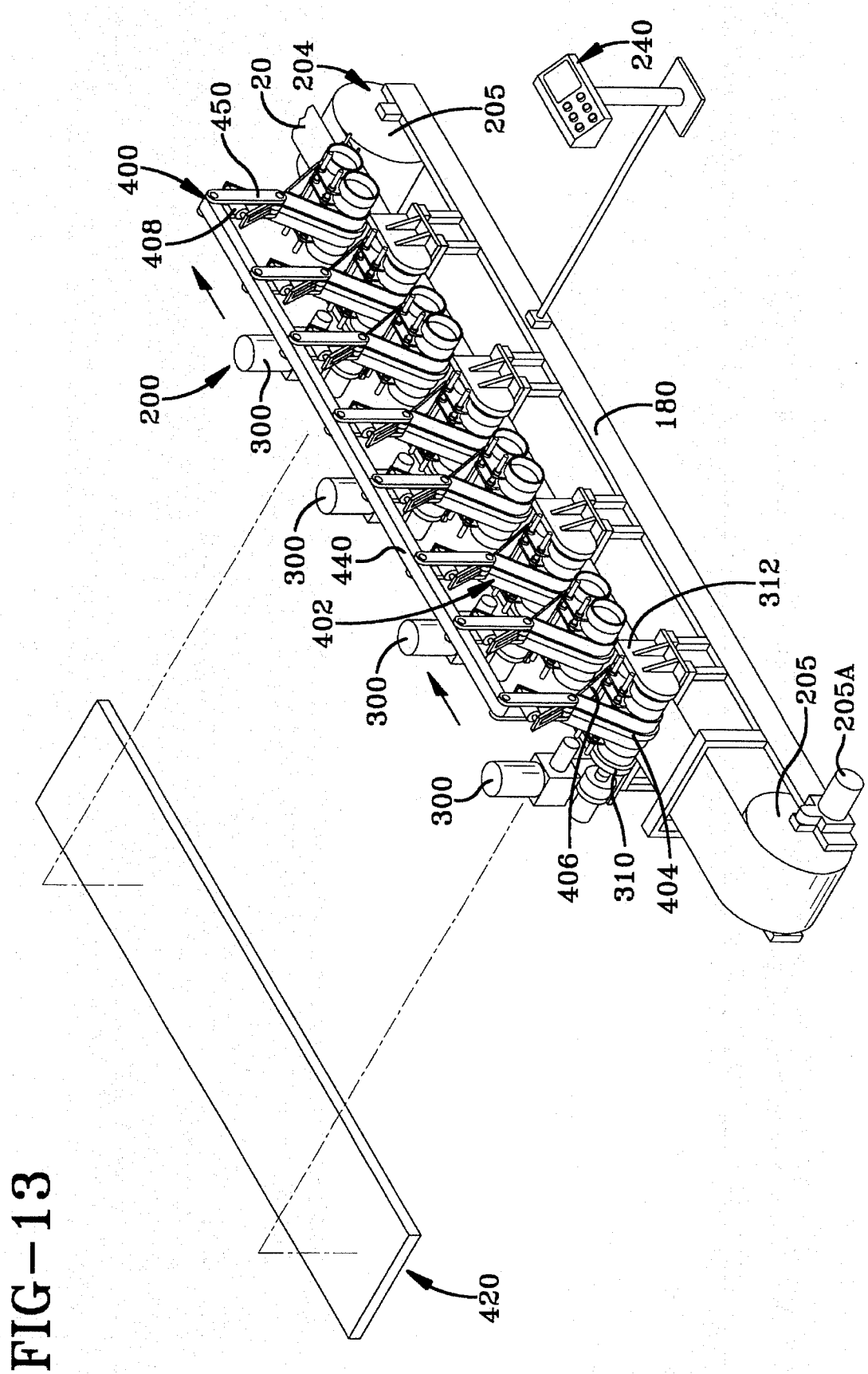
Figure 14:
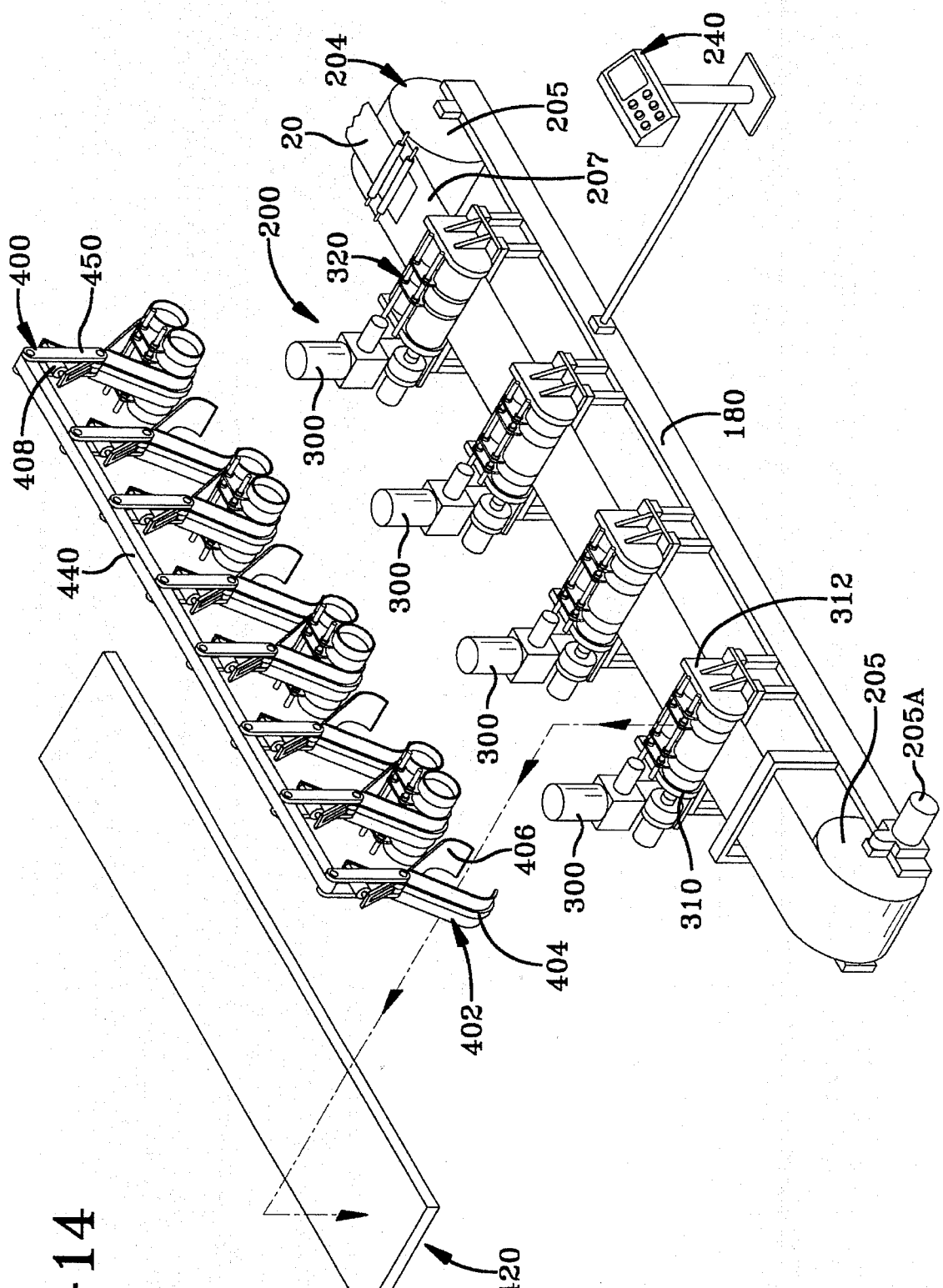

In normal operation, the exchange of sets of pairs of rollers 350, 352 to an operational apparatus 200 is illustrated in FIGS. 10 through 14. In FIG. 10 the transfer mechanism 400 is shown moving to pick up four new sets of rollers 350, 352 from a roller staging area to be installed in the apparatus 200. As shown in FIG. 11, the transfer mechanism 400 has an unloaded station 402 adjacent a station 402 holding each new set of roller pairs 350, 352. The unloaded stations 402 are centered over the to be replaced roller pairs 350, 352 clamped in the apparatus 200 then lowered into position such that the first and second arms 404, 406 of each unloaded station 402 can grasp a roller pair for removal as shown in FIG. 12. The end 316 is then extended freeing the to be replaced roller pairs 350, 352. The transfer mechanism 400 as shown in FIG. 12, is indexed one station 402 thus centering the new set of roller pairs 350, 352. The end 316 of the apparatus 200 is closed thus clamping and supporting the new roller pairs as shown in FIG. 12. The arms 404 and 406 are opened and the transfer mechanism 400 is raised and sent back to the roller staging area carrying the replaced rollers as shown in FIG. 14. The above described quick change apparatus greatly enhances the ability to change calender rollers safely and efficiently. The above-described means 400 for removing the rollers has a plurality of stations 402 for grasping and carrying one or more roller 350, 352. Each station 402 has a structure which has a pivoted first arm 404 and a second arm 406. The arms 404, 406 are contoured and are adapted to grasp a pair of rollers 350 and 352 when the operator actuates a cylinder 408 which permits the arms 404, 406 to open or close on the operator's demand. Once securely cradled the cylindrical rollers 350, 352 can be easily moved as shown in the illustrations without requiring any manual lifting. Each station 402 is connected to the overhead beam 440 by a pair of pivoting links 450. This enables the arms 404, 406 to be pivotably movable relative to the calender 302. This facilitates the closing of the slidable end 312 with clamping and supporting means 316 without binding the rollers 350 or 352 onto the hubs 314, 316. This entire procedure can be accomplished in minutes enabling very rapid tire construction changeovers with minimal manual labor.

What is claimed is:

1. A method of exchanging a calender roller of a calender apparatus with a different calender roller, the apparatus having axially aligned first and second rotatable supports between which the calender roller is rotatably clamped, the method comprising the steps of:

unclamping the roller by increasing the spacing between the first and second rotatable supports;

removing the roller;

moving a different calender roller into position between the first and second supports;

clamping the different calender roller between the first and second supports by decreasing the spacing between the first and second supports and engaging the respective ends of the different roller with the first and second supports; and controlling the magnitude of the clamping force exerted on the different roller, the clamping force being controlled by providing mating conical surfaces on the rollers and first and second supports and by controlling the spacing between the first and second supports after their engagement with the different roller.

2. A method of exchanging a plurality of calender rollers with different rollers in a calendering system having a plurality of calendering apparati, more than one calendering apparatus having at least one calender roller that is replaced by a different roller and having axially aligned first and second supports between which a calender roller to be exchanged is clamped, the method comprising the steps of:

establishing a staging area containing a plurality of different rollers to be exchanged for the plurality of calender rollers to be exchanged in the calendering system;

transporting the plurality of different rollers with a transfer mechanism to the calendering system at one time;

grasping the rollers to be exchanged in the transfer mechanism;

unclamping the rollers to be exchanged from their first and second respective supports;

indexing the transfer mechanisms;

clamping the different rollers between respective first and second supports of each calender apparatus; and with the transfer mechanism, transporting the grasped rollers to an area away from the calendering apparati.

3. A calendering apparatus for forming elastomeric components, the apparatus comprising:

a frame, the frame having first and second ends, the second end being slidably movable relative to the first end;

at least two generally cylindrical rollers, each cylindrical roller being hollow and having a first and second ends, the first and second ends being conically tapered;

a means for clamping and supporting the calender rollers at their first and second ends, the calender rollers being rotatably supported and positioned adjacent one another with their respective axes parallel to one another, the clamping and supporting means being movable in the axial direction of the rollers to vary the clamping force; and a means for rotating at least one of the rotatable clamping and supporting means.

4. The calendering apparatus of claim 3 wherein the means for clamping and supporting the ends of the roller are rotatable hubs having conical surfaces that mate with the conical ends of the rollers.

5. The calendering apparatus of claim 4 wherein the hubs are conically tapered at an angle of at least 6°.

6. The calendering apparatus of claim 4 wherein the roller ends are conically tapered at an angle of at least 6°.

* * * * *